United States Patent
Pedersen

(10) Patent No.: US 10,577,224 B2
(45) Date of Patent: Mar. 3, 2020

(54) LIFTING ARRANGEMENT FOR LIFTING A WIND TURBINE COMPONENT

(71) Applicant: Vestas Wind Systems A/S, Aarhus N. (DK)

(72) Inventor: Gunnar K. Storgaard Pedersen, Skjern (DK)

(73) Assignee: Vestas Wind Systems A/S, Aarhus N (DK)

( * ) Notice: Subject to any disclaimer, the term of this patent is extended or adjusted under 35 U.S.C. 154(b) by 66 days.

(21) Appl. No.: 15/762,246

(22) PCT Filed: Sep. 30, 2016

(86) PCT No.: PCT/DK2016/050315
§ 371 (c)(1),
(2) Date: Mar. 22, 2018

(87) PCT Pub. No.: WO2017/054830
PCT Pub. Date: Apr. 6, 2017

(65) Prior Publication Data
US 2018/0265335 A1    Sep. 20, 2018

(30) Foreign Application Priority Data

Oct. 1, 2015  (DK) .................... 2015 70619

(51) Int. Cl.
*B66C 1/10* (2006.01)
*F03D 13/10* (2016.01)
(Continued)

(52) U.S. Cl.
CPC .............. *B66C 1/108* (2013.01); *B66C 1/12* (2013.01); *E04H 12/342* (2013.01); *F03D 13/10* (2016.05);
(Continued)

(58) Field of Classification Search
CPC .......... B66D 1/108; B66D 1/107; B66D 1/12; E04H 12/342; F03D 13/10; F05B 2230/61; F05B 2240/912; Y02P 70/523
See application file for complete search history.

(56) References Cited

U.S. PATENT DOCUMENTS

2008/0216301 A1*  9/2008  Hansen ................. B66C 1/108
                                                                  29/428
2011/0220538 A1    9/2011  Nies
(Continued)

FOREIGN PATENT DOCUMENTS

CN          2786077 Y    6/2006
CN          1833985 A    9/2006
(Continued)

OTHER PUBLICATIONS

European Patent Office, Examination Report in EP 1677897.6, dated May 20, 2019.
(Continued)

*Primary Examiner* — Emmanuel M Marcelo
(74) *Attorney, Agent, or Firm* — Wood Herron & Evans LLP

(57) ABSTRACT

A lifting arrangement (1) for lifting a wind turbine tower segment (2), the lifting arrangement (1) comprising at least two component pulley arrangements (3) connected to a flange (5) of the tower segment, and at least one hoisting pulley arrangement (4), arranged to be connected to a hoisting apparatus. A rope (8) interconnects the component pulley arrangements (3) and the hoisting pulley arrangements (4), in such a manner that each component pulley arrangement (3) is connected to two hoisting pulley arrangements (4), or to one hoisting pulley arrangement (4) and a rope end attachment point (9), via the rope (8), and each hoisting pulley arrangement (4) is connected to two component pulley arrangements (3), via the rope (8), the rope (8)
(Continued)

being arranged movably in each pulley arrangement (3, 4). The tower segment (2) is automatically rotated from a first orientation into a second orientation during the lifting process. Load distribution among various parts of the rope (8) is ensured.

18 Claims, 4 Drawing Sheets

(51) Int. Cl.
*B66C 1/12* (2006.01)
*E04H 12/34* (2006.01)

(52) U.S. Cl.
CPC ..... *F05B 2230/61* (2013.01); *F05B 2240/912* (2013.01); *Y02E 10/728* (2013.01); *Y02P 70/523* (2015.11)

(56) References Cited

U.S. PATENT DOCUMENTS

| | | | | |
|---|---|---|---|---|
| 2011/0258829 | A1* | 10/2011 | Vanderbeke | E02B 17/027 |
| | | | | 29/428 |
| 2011/0260126 | A1* | 10/2011 | Willis | B63B 27/08 |
| | | | | 254/283 |
| 2011/0266096 | A1* | 11/2011 | Nies | B66B 9/16 |
| | | | | 187/251 |
| 2011/0298232 | A1* | 12/2011 | Reger | B66C 1/10 |
| | | | | 294/81.5 |
| 2012/0305869 | A1* | 12/2012 | Cho | B66C 1/36 |
| | | | | 254/336 |
| 2012/0319065 | A1* | 12/2012 | Scott | B66D 1/12 |
| | | | | 254/362 |

FOREIGN PATENT DOCUMENTS

| | | |
|---|---|---|
| CN | 101434366 A | 5/2009 |
| CN | 201292203 Y | 8/2009 |
| CN | 201809032 U | 4/2011 |
| CN | 202379591 U | 8/2012 |
| CN | 103407872 A | 11/2013 |
| CN | 203806937 U | 9/2014 |
| CN | 203820281 U | 9/2014 |
| CN | 204224079 U | 3/2015 |
| DE | 202010003033 U1 | 5/2010 |
| SE | 411743 B | 2/1980 |
| WO | 2008000262 A1 | 1/2008 |
| WO | 2009064491 A2 | 5/2009 |
| WO | 2011056251 A1 | 5/2011 |

OTHER PUBLICATIONS

European Patent Office, International Search Report and Written Opinion in PCT/DK2016/050315, dated Jan. 17, 2017.
Danish Patent and Trademark Office, Search and Exam Report in PA 2015/70619, dated Apr. 29, 2016.
China National Intellectual Property Administration, First Notification of Office Action in CN Application No. 201680058346.4, dated Nov. 23, 2018.

* cited by examiner

LIFTING ARRANGEMENT FOR LIFTING A WIND TURBINE COMPONENT

FIELD OF THE INVENTION

The present invention relates to a lifting arrangement for lifting a tower segment. The lifting arrangement of the invention causes the tower segment to be automatically rotated from a first orientation into a second orientation, while being lifted. The present invention further relates to a method for lifting a tower segment, using the lifting arrangement.

BACKGROUND OF THE INVENTION

Large wind turbine components, such as tower segments need to be lifted into place when the wind turbine is erected. To this end, lifting arrangements interconnecting the tower segments and a crane, are often used.

WO 2009/064491 A2 discloses a method, a system, and a device for erecting a tower. A base section, a top section and one or more intermediate sections are assembled proximate to the ground, thereby forming an assembled tower lying in a substantially horizontal first plane. The assembled tower is lifted to a second plane defining an acute angle to the first plane, by means of a lift initiator. Finally, the assembled tower is lifted from the second plane to a vertical plane with a pulley system.

WO 2008/000262 A1 discloses a universal lifting tool which can be mounted on tower section flanges of varying diameter. A cable can be attached to the lifting tools mounted on the tower section flange, and to lifting equipment, e.g. in the form of a crane.

DESCRIPTION OF THE INVENTION

It is an object of embodiments of the invention to provide a lifting arrangement for lifting a wind turbine tower segment which causes the tower segment to be automatically rotated from a first orientation into a second orientation, while being lifted.

It is a further object of embodiments of the invention to provide a lifting arrangement for lifting a tower segment which ensures an equal load distribution among connecting points between the lifting arrangement and the tower segment, during the entire lifting operation.

It is an even further object of embodiments of the invention to provide a method for lifting a tower segment in which the tower segment is automatically rotated from a first orientation into a second orientation during lifting of the tower segment. Particularly it is an object, to automatically rotate the tower segment from an essentially horizontal orientation to an upright or vertical orientation and to maintain an equal distribution of load among the connection points during this process. Such a reorientation is desire, e.g. when the tower is erected on the construction site where the wind turbine is assembled.

It is an even further object of embodiments of the invention to provide a method for lifting a tower segment in which an equal load distribution among connecting points between a lifting arrangement and the tower segment is ensured, during the entire lifting operation.

According to a first aspect, the invention provides a lifting arrangement for lifting a wind turbine tower segment, the lifting arrangement comprising:
  at least two component pulley arrangements connected to a flange of the tower segment,
  at least one hoisting pulley arrangement, arranged to be connected to a hoisting apparatus, and
  a rope interconnecting the component pulley arrangements and the hoisting pulley arrangements, in such a manner that each component pulley arrangement is connected to two hoisting pulley arrangements, or to one hoisting pulley arrangement and a rope end attachment point, via the rope, and each hoisting pulley arrangement is connected to two component pulley arrangements, via the rope, the rope being arranged movably in each pulley arrangement.

According to the first aspect the invention relates to a lifting arrangement for lifting a wind turbine tower segment. In the present context the term 'wind turbine tower segment' should be interpreted to mean a component, preferably a large and/or heavy component, which forms part of a wind turbine tower. The tower segment could be lifted into place during erection of the wind turbine or during replacement of tower segments. The lifting arrangement of the invention is adapted to be used during such a lifting process.

The lifting arrangement comprises at least two component pulley arrangements and at least one hoisting pulley arrangement. The component pulley arrangements are arranged to be connected to the tower segment, and the hoisting pulley arrangement(s) is/are arranged to be connected to a hoisting apparatus. In the present context the term 'hoisting apparatus' should be interpreted to mean equipment being capable of performing the actual lifting or hoisting of the tower segment. The hoisting apparatus could, e.g., be in the form of a crane or a winch system. Thus, the lifting arrangement interconnects the tower segment and the hoisting apparatus, via the component pulley arrangements and the hoisting pulley arrangement(s).

In the present context the term 'pulley arrangement' should be interpreted to mean an arrangement comprising one or more pulleys, each pulley being adapted to receive a rope or the like in a manner which allows the rope to move relative to the pulley. Thus, a pulley arrangement could simply be a single pulley, or it could be a collection or an assembly of two or more pulleys arranged in the vicinity of each other, and/or being attached to, or forming part of a common structure.

It should be noted that the component pulley arrangements and the hoisting pulley arrangement(s) may not necessarily be connected directly to the tower segment and the hoisting apparatus, respectively, but could be connected thereto in an indirect manner, via one or more further parts, such as ropes, straps, further pulleys, or clamps, etc.

The lifting arrangement further comprises a rope interconnecting the component pulley arrangements and the hoisting pulley arrangements, in such a manner that each component pulley arrangement is connected to two hoisting pulley arrangements, or to one hoisting pulley arrangement and a rope end attachment point, via the rope, and each hoisting pulley arrangement is connected to two component pulley arrangements, via the rope. Thus, the rope alternatingly passes through a component pulley arrangement and a hoisting pulley arrangement. More specifically, when the rope passes through a pulley arrangement, it passes through one or more pulleys of the pulley arrangement.

Furthermore, ends of the rope may be connected to rope end attachment points. For instance, the rope may start at a rope end attachment point, then run through one or more pulleys of a component pulley arrangements, one or more pulleys of a hoisting pulley arrangement, one or more pulleys of a component pulley arrangement, etc., until all component pulley arrangements and all hoisting pulley arrangements are connected to the rope, and then the opposite end of the rope is attached to a rope end attachment point. As an alternative, the rope may be an endless rope, arranged alternatingly between component pulley arrangements and hoisting pulley arrangements, or the rope ends may be joined, thereby forming a structure corresponding essentially to an endless rope.

The rope is arranged movably in each pulley arrangement. Thereby, the distance between neighbouring pulley arrangements, defined by the part of the rope interconnecting the pulley arrangements, is variable. This, along with the alternating path of the rope between component pulley arrangements and hoisting pulley arrangements, allows the tower segment to be automatically rotated from one orientation into another orientation as the tower segment is lifted. Furthermore, shifting the relative distance between neighbouring pulley arrangements as described above, ensures that the loads applied to various parts of the rope, such as parts of the rope arranged at or near the various connecting points, are substantially equalized. This minimises the risk of applying an uneven load to the tower segment, thereby causing deformation of the tower segment. Furthermore, it is avoided that a part of the rope is subjected to excessive loads.

The number of hoisting pulley arrangements may be equal to the number of component pulley arrangements. According to this embodiment, the rope may advantageously be an endless rope, alternatingly running through the component pulley arrangements and the hoisting pulley arrangements.

As an alternative, the number of hoisting pulley arrangements may be one less than the number of component pulley arrangements. Thus, according to this embodiment, in the case that the number of component pulley arrangements is two, then the number of hoisting pulley arrangements is one, in the case that the number of component pulley arrangements is three, then the number of hoisting pulley arrangements is two, etc. According to this embodiment, the rope may advantageously comprise one rope end attached to a first rope end attachment point and another rope end attached to a second rope end attachment point, the rope extending between the rope end attachment point, alternatingly via component pulley arrangements and hoisting pulley arrangements. The two rope end attachment points may e.g. be located directly adjacent each other. In one embodiment, the two rope end attachment points are both on the crane hook used for lifting the lifting arrangement.

The attachment points may be joined. As an example, the two free robe ends of the rope may be tied together, or they may be joined e.g. by tying each of them to one and the same ring or hook of the hoisting apparatus. By joining the attachment point, the lifting arrangement may become more compact, e.g. when compared to an alternative solution where they are attached at opposite ends of an elongated boom or lifting yoke.

In one embodiment, the lifting arrangement comprises no lifting yokes in the form of elongated beams to which the component pulley arrangements could have been attached.

The hoisting apparatus may typically be a crane, e.g. a mobile crane or similar crane suitable for the construction of wind turbines. Such cranes are often fitted with a lifting hook, and in this case, the single lifting point to which the free ends of the wire are attached, may be attached to the lifting hook of the crane.

The robe extending from each attachment point to the nearest component pulley may form an angle of at least 10 degrees from vertical and e.g. less than 75 degrees from vertical corresponding to 15 degrees from horizontal. The range may e.g. be between 15 and 60 degrees such as between 20 and 50 degrees. These ranges are suitable particularly for lifting of tower segments by the flanges of the segments.

Each hoisting pulley arrangement could be movable in a direction to and from adjacent hoisting pulley arrangements. The movability of the hoisting pulley arrangements provides an increased flexibility and allows the lifting arrangement to adapt to the shape and size of the tower segment. This again facilitates an equal load distribution. Adjacent hoisting pulley arrangements may e.g. be movable to an extent where adjacent hoisting pulley arrangements touch each other.

Each component pulley arrangement may be attached to attaching points on the flange by means of a rope attached to the flange, or the component pulley arrangements may be fixed directly to the flange, e.g. by use of a swivel, a snap hook, a shackle, or any similar fastening means.

If the component pulley arrangement may be attached to attaching points on the flange by means of a rope, then the ropes may form the same distance from each component pulley arrangement to the corresponding attaching points on the flange. This may be provided e.g. by use of ropes having essentially the same or identical length.

The ropes could attach each component pulley to at least one attaching point. E.g. to enable use of standard lifting ropes, it may be an advantage however, if each rope attach the corresponding component pulley to two attaching points.

Irrespective whether the component pulley arrangement is attached directly to the flange or attached to the flange by rope, it may be considered not to attach the lifting arrangement such that the rope can move against the edges of the flange during lifting.

In one embodiment, the lifting arrangement comprises at least three component pulley arrangements attached to the flange (5) such that the distances between the attachment point(s) of the component pulley and the attachment point(s) of the adjacent component pulley arrangement are essentially the same or even identical. Accordingly, the attachment point(s) of the component pulley arrangements may be displaced along the tower segment flange at most 120 degrees corresponding to three component pulley arrangements. If each component pulley arrangement is attached by means of a rope to two attachment points, then the mentioned essentially same distance is the distance from a centre point between the two attachment points of one component pulley to the centre point between the two attachment points of the adjacent component pulley.

Each of the hoisting pulley arrangements could be connected to a single connecting point by a rope, and each rope may extend from the single connecting point towards the corresponding hoisting pulley arrangement such that they form a cone shape symmetrically with respect to a vertical axis through the single connecting point. This provides a compact shape of the lifting arrangement with very little sideways space requirement. This is an advantage e.g. when assembling several towers close to each other or close to other obstacles.

All of the hoisting pulley arrangements may be arranged to be connected to the hoisting apparatus via a single connecting point. The single connecting point could, e.g., be a hook of a crane or a similar part of a hoisting apparatus. According to this embodiment, a lifting force is transferred from the hoisting apparatus to the lifting arrangement via the single connecting point, during the lifting process.

In one embodiment, the tower segment has a diameter, D, and the rope has a length, L. To combine the ability to provide equal load distribution and yet good control over the balance of the tower segment, it may be an advantage to provide the robe between the component pulley arrangements and the hoisting pulley arrangements with a length, L, being at least 2 times D, e.g. 3, 4, 5 or 6 times D.

According to a second aspect the invention provides a method for lifting a tower segment using a lifting arrangement according to the first aspect of the invention, the method comprising the steps of:

connecting the component pulley arrangements to the tower segment, the tower segment being arranged in a first orientation, and at least two component pulley arrangements being attached to the tower segment at attaching points which are displaced relative to each other along a vertical direction, connecting the hoisting pulley arrangement(s) to a hoisting apparatus, mounting the rope in the component pulley arrangements and the hoisting pulley arrangements, in such a manner that each component pulley arrangement is connected to two hoisting pulley arrangements, or to one hoisting pulley arrangement and a rope end attachment point, via the rope, and each hoisting pulley arrangement is connected to two component pulley arrangements, via the rope, and lifting the hoisting pulley arrangements by means of the hoisting apparatus, thereby causing a relative movement between the rope and the pulley arrangements, said relative movement causing the tower segment to rotate into a second orientation, while the tower segment is lifted by means of the hoisting apparatus and via the lifting arrangement.

It should be noted that a skilled person would readily recognise that any feature described in combination with the first aspect of the invention could also be combined with the second aspect of the invention, and vice versa. The remarks set forth above are therefore equally applicable here.

In the method according to the second aspect of the invention, the component pulley arrangements are initially connected to the tower segment, the tower segment being arranged in a first orientation. The first orientation may advantageously be an orientation in which a longitudinal axis defined by the tower segment extends substantially along the ground. In any event, the first orientation preferably differs from the orientation in which the tower segment is supposed to be arranged when it is positioned in the wind turbine.

At least two of the component pulley arrangements are attached to the tower segment at attaching points which are displaced relative to each other, e.g. in a vertical direction. Thus, at least two of the component pulley arrangements are arranged one above the other, when the lifting arrangement is mounted on, or attached to the tower segment. It is not ruled out that some of the component pulley arrangements may further be displaced relative to each other along a horizontal direction.

Furthermore, the hoisting pulley arrangement(s) is/are connected to a hoisting apparatus.

Next, the rope is mounted in the component pulley arrangements and the hoisting pulley arrangements, in such a manner that each component pulley arrangement is connected to two hoisting pulley arrangements, or to one hoisting pulley arrangement and a rope end attachment point, via the rope, and each hoisting pulley arrangement is connected to two component pulley arrangements, via the rope.

Accordingly, the lifting arrangement is connected to the tower segment and to the hoisting apparatus, via the respective pulley arrangements and the rope. Thus, the lifting arrangement interconnects the tower segment and the hoisting apparatus, thereby allowing the tower segment to be lifted or hoisted by means of the hoisting apparatus.

Next, the hoisting pulley arrangements are lifted by means of the hoisting apparatus. Since the rope interconnects the component pulley arrangements and the hoisting pulley arrangement in an alternating manner, as described above, and since the rope is arranged movably with respect to the pulleys of the pulley arrangements, the lengths of the rope parts interconnecting neighbouring pulley arrangements can be changed. Therefore, when a pulling force is applied to the hoisting pulley arrangements, by means of the hoisting apparatus, the rope will tend to move relative to the pulleys of the pulley arrangements in such a manner that the distance between the uppermost component pulley arrangement and its neighbouring hoisting pulley arrangements is increased, while the distance between the lowermost component pulley arrangement and its neighbouring hoisting pulley arrangements is decreased. This causes the tower segment to rotate into a second orientation, while the tower segment is lifted by means of the hoisting apparatus and via the lifting arrangement. Furthermore, since this occurs automatically when the hoisting pulley arrangements are lifted by means of the hoisting apparatus, it is also ensured that the load distribution among various parts of the rope and among various connecting points is substantially equalized, as described above.

Furthermore, since the lifting is carried out in the flange, the lifting may be carried out without direct sliding contact between ropes and the tower segment.

The step of connecting the component pulley arrangements to the tower segment may comprise connecting the component pulley arrangements at attaching points arranged substantially equidistantly along a circumference of the tower segment, e.g. offset at most 120 degrees corresponding to at least three component pulley arrangements.

According to this embodiment, the points where force is transferred between the lifting arrangement and the tower segment are distributed in an equidistant manner on the tower segment. This provides an even distribution of the loads applied to the tower segment, thereby minimising the risk of deformation of the tower segment during the lifting or hoisting process. Further, it increases the balance of the tower segment in the upright orientation and reduces or prevents unintended rotation about the longitudinal, upright, tower axis.

The step of connecting the hoisting pulley arrangements to a hoisting apparatus may comprise connecting all of the hoisting pulley arrangements to a single connecting point. The single connecting point could, e.g., be a hook of a crane or a similar part of a hoisting apparatus, as described above. Thereby the pulling force applied to the lifting arrangement by the hoisting apparatus is applied in a single point.

The relative movement between the rope and the pulley arrangements, caused by lifting the hoisting pulley arrangements, may cause lengths of rope arranged between interconnected pulley arrangements to be changed, thereby causing the rotation of the tower segment. This has already been described above.

BRIEF DESCRIPTION OF THE DRAWINGS

The invention will now be described in further detail with reference to the accompanying drawings in which.

DETAILED DESCRIPTION OF THE DRAWINGS

Figure 1:
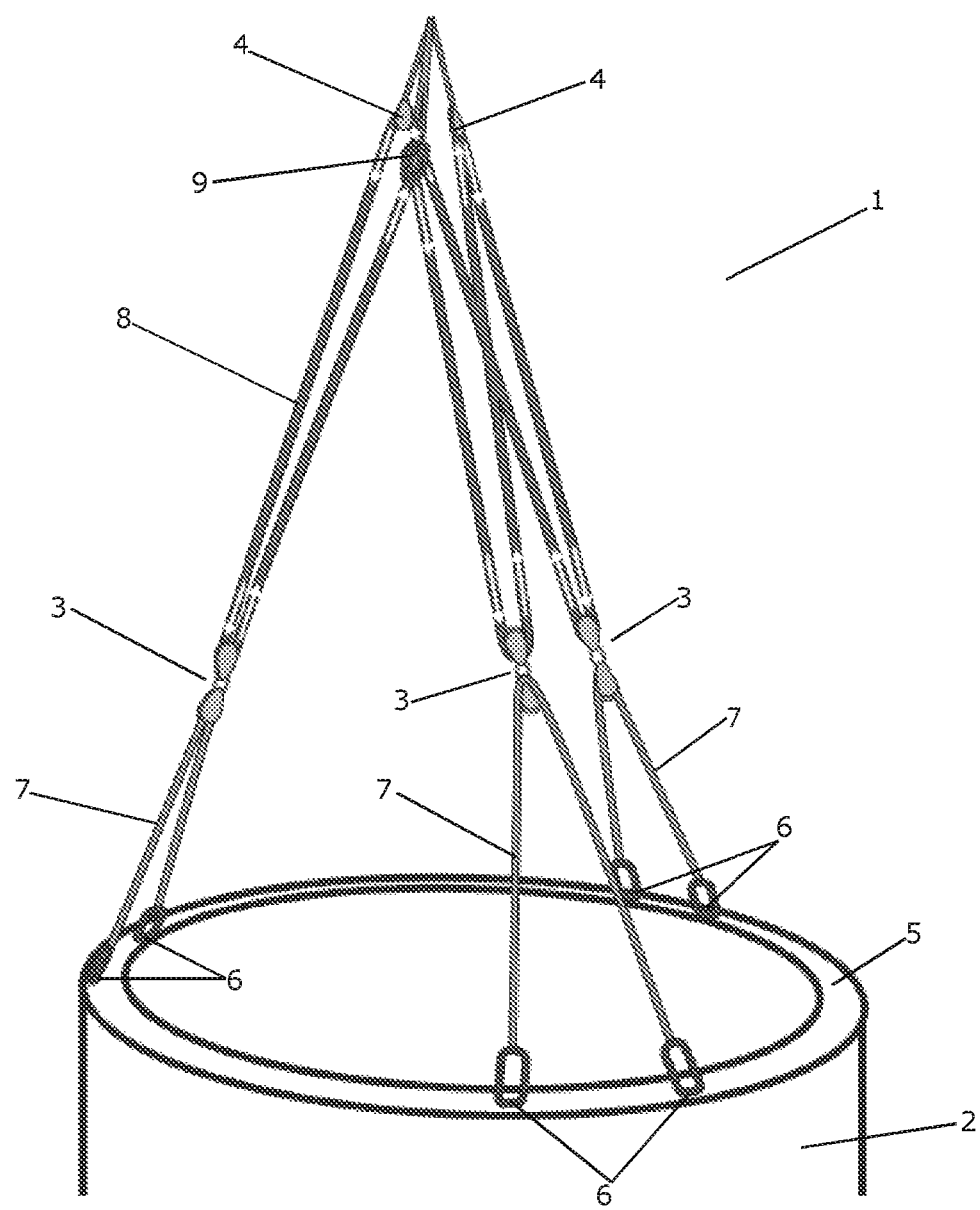
FIG. 1 is a perspective view of a lifting arrangement according to an embodiment of the invention, holding a tower segment in a second orientation.

FIG. 1 is a perspective view of a lifting arrangement 1 according to an embodiment of the invention. The lifting arrangement 1 is mounted on a wind turbine tower segment 2. The tower segment 2 is arranged in a second orientation, and is in the process of being lifted or hoisted. This will be described in further detail below with reference to FIGS. 3a-3c.

The lifting arrangement 1 comprises three component pulley arrangements 3 and two hoisting pulley arrangements 4. Each of the component pulley arrangements 3 is connected to a connecting flange 5 of the tower segment 2 at two attaching points 6, via a rope 7. Each of the hoisting pulley arrangements 4 is connected to a single point of a hoisting apparatus (not shown), e.g. in the form of a crane.

A rope 8 interconnects the component pulley arrangements 3 and the hoisting pulley arrangement 4 in an alternating manner, as described above. The ends of the rope 8 are connected to a rope end attachment point 9, which is also connected to the hoisting apparatus thereby joining the attachment points. Thus, the rope 8 runs from the rope end attachment point 9, through a first component pulley arrangement 3, a first hoisting pulley arrangement 4, a second component pulley arrangement 3, a second hoisting pulley arrangement 4, a third component pulley arrangement 3, and is finally received at the rope end attachment point 9. This is illustrated by the arrows shown at the rope 8.

Since the rope 8 passes through pulleys of the pulley arrangements 3, 4, it is allowed to move relative to the pulley arrangements 3, 4. Accordingly, the distances between neighbouring pulley arrangements 3, 4, defined by the part of the rope 8 which interconnects the pulley arrangements 3, 4, can be changed. This will be described in further detail below. In FIG. 1 the distances between the various neighbouring pulley arrangements 3, 4 are substantially identical.

Figure 2:
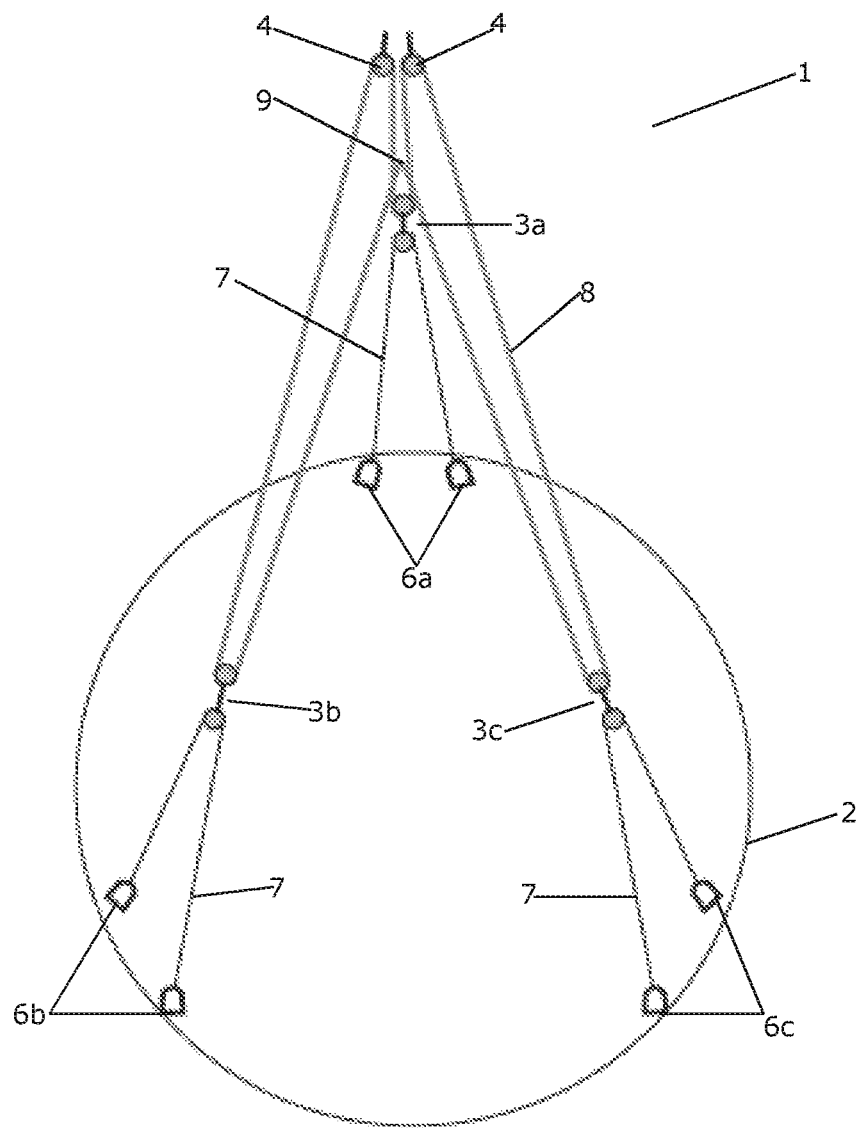
FIG. 2 is a front view of the lifting arrangement of FIG. 1, holding the tower segment in a first orientation.

FIG. 2 is a front view of the lifting arrangement 1 of FIG. 1, the lifting arrangement 1 holding a tower segment 2. The tower segment 2 is arranged in a first orientation, in which a longitudinal axis defined by the tower segment 2 extends along the ground. It can be seen that one of the component pulley arrangements 3a is connected to the tower segment 2 at attaching points 6a which are displaced along a vertical direction with respect to the attaching points 6b, 6c of the other two component pulley arrangements 3b, 3c. This has the consequence that a larger part of the rope 8 is arranged between the component pulley arrangements 3b, 3c and their neighbouring hoisting pulley arrangements 4, than between the component pulley arrangement 3a and its neighbouring hoisting pulley arrangements 4.

Figures 3A, 3B, 3C:
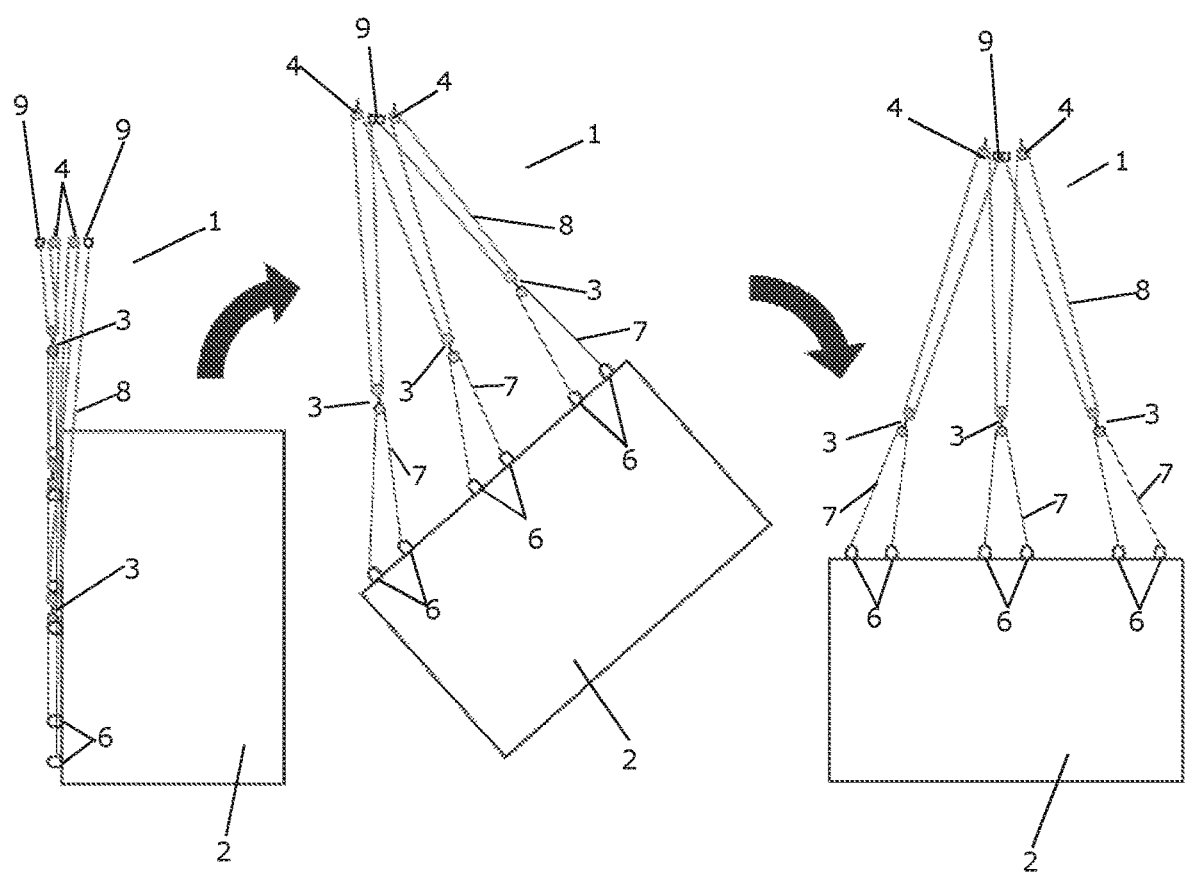
FIGS. 3a-3c are side views of the lifting arrangement of FIGS. 1 and 2, at various stages during lifting of the tower segment.

FIGS. 3a-3c are side views of the lifting arrangement 1 of FIGS. 1 and 2, at various stages during lifting of the tower segment 2. In FIG. 3a the tower segment 2 is arranged in the first orientation, i.e. the same orientation as the tower segment 2 shown in FIG. 2. The hoisting pulley arrangements 4 and the rope end attachment points 9 are connected to a hoisting apparatus (not shown), but a pulling force is not yet being applied from the hoisting apparatus to the lifting arrangement 1.

In FIG. 3b the lifting or hoisting process has been initiated, and a pulling force is therefore applied by the hoisting apparatus to the lifting arrangement 1, via the hoisting pulley arrangements 4 and the rope end attachment points 9. Since the rope 8 is arranged movably with respect to the pulleys of the pulley arrangements 3, 4, this has the effect that the distances between neighbouring pulley arrangements 3, 4 change in such a manner that the shorter distances become longer and the longer distances become shorter. Thereby the tower segment 2 is automatically rotated, as illustrated in FIG. 3b. Furthermore, the automatic rotation of the tower segment 2 ensures that the loads applied to various parts of the rope 8 during the lifting or hoisting process are equalized. Thereby, it is ensured that the loads applied to the tower segment 2 at the attaching points 6 are evenly distributed along the circumference of the tower segment 2, thereby reducing the risk of deformation of the tower segment. Furthermore, it is ensured that no part of the rope 8 is subjected to excessive loads.

In FIG. 3c the rotation of the tower segment 2 has been completed, and the tower segment 2 is thereby arranged in the second orientation, i.e. in the orientation illustrated in FIG. 1. Thus, the tower segment 2 can be lifted into position while being in the second orientation, i.e. the lifting or hoisting process can be completed.

Figure 4:
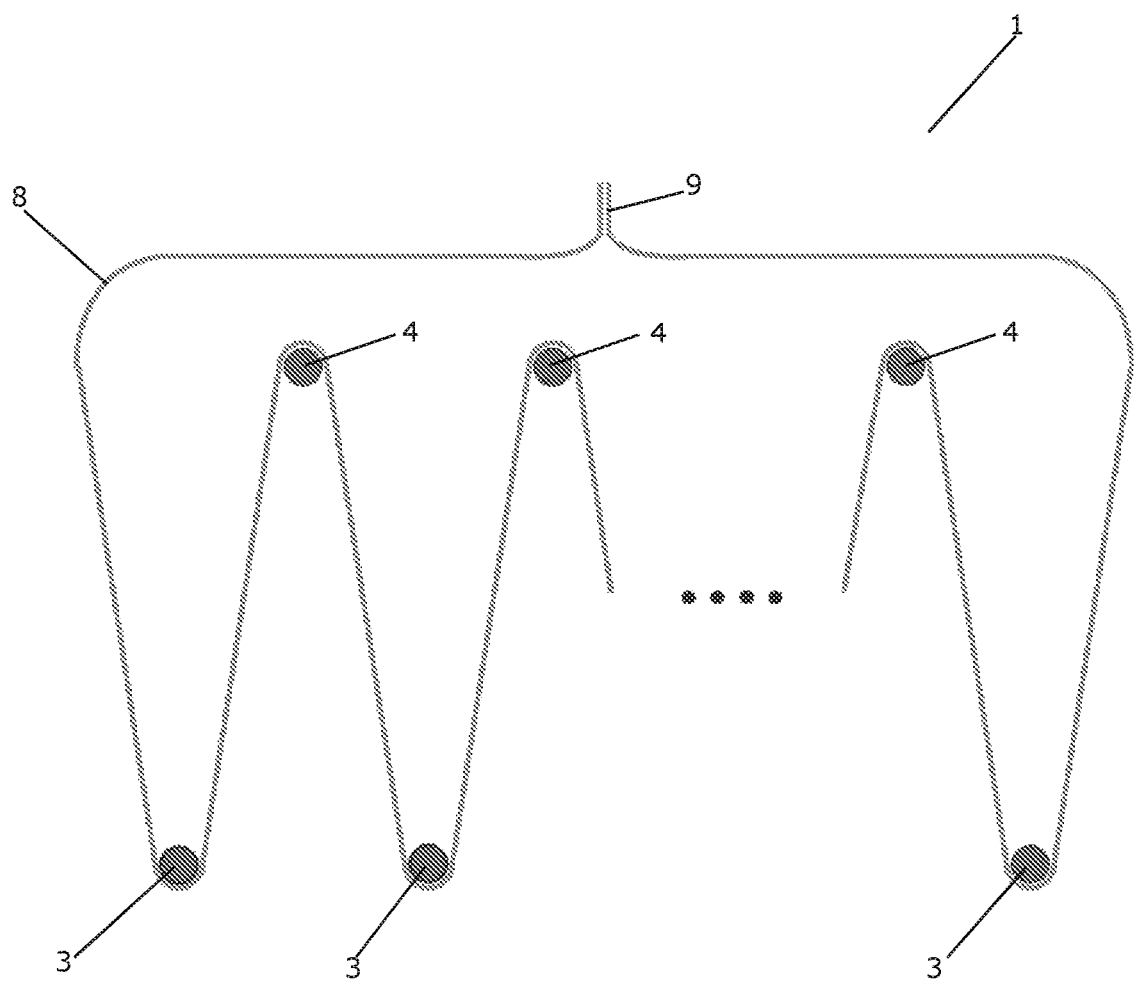
FIG. 4 illustrates interconnection of pulley arrangements via a rope in a lifting arrangement according to an embodiment of the invention.

FIG. 4 illustrates interconnection of pulley arrangements 3, 4 via a rope 8 in a lifting arrangement 1 according to an embodiment of the invention. It can be seen that the rope 8 alternatingly interconnects component pulley arrangements 3 and hoisting pulley arrangements 4. In FIG. 4 three component pulley arrangements 3 and three hoisting pulley arrangements 4 are shown. However, it should be noted that the lifting arrangement could include further component pulley arrangements 3 and further hoisting pulley arrangements 4.

NUMBERED EMBODIMENTS

In a third aspect, the invention may provide a lifting arrangement for lifting a wind turbine component in general, e.g. with the following numbered embodiments.

Embodiment 1

A lifting arrangement (1) for lifting a wind turbine component (2), the lifting arrangement (1) comprising:

at least two component pulley arrangements (3), arranged to be connected to the wind turbine component (2), at least one hoisting pulley arrangement (4), arranged to be connected to a hoisting apparatus, and a rope (8) interconnecting the component pulley arrangements (3) and the hoisting pulley arrangements (4), in such a manner that each component pulley arrangement (3) is connected to two hoisting pulley arrangements (4), or to one hoisting pulley arrangement (4) and a rope end attachment point (9), via the rope (8), and each hoisting pulley arrangement (4) is connected to two component pulley arrangements (3), via the rope (8), the rope (8) being arranged movably in each pulley arrangement (3, 4).

Embodiment 2

A lifting arrangement (1) according to embodiment 1, wherein the number of hoisting pulley arrangements (4) is equal to the number of component pulley arrangements (3).

Embodiment 3

A lifting arrangement (1) according to embodiment 1, wherein the number of hoisting pulley arrangements (4) is one less than the number of component pulley arrangements (3).

Embodiment 4

A lifting arrangement (1) according to any of the preceding embodiments, wherein each component pulley arrangement (3) is arranged to be attached to the wind turbine component (2) by means of a rope (7) attached to the wind turbine component (2) at two attaching points (6).

Embodiment 5

A lifting arrangement (1) according to any of the preceding embodiments, wherein the lifting arrangement (1) comprises at least three component pulley arrangements (3) and at least two hoisting pulley arrangements (4).

Embodiment 6

A lifting arrangement (1) according to any of the preceding embodiments, wherein the wind turbine component is a tower segment (2).

Embodiment 7

A lifting arrangement (1) according to any of the preceding embodiments, wherein all of the hoisting pulley arrangements (4) are arranged to be connected to the hoisting apparatus via a single connecting point.

Embodiment 8

A method for lifting a wind turbine component (2) using a lifting arrangement (1) according to any of the preceding embodiments, the method comprising the steps of:
  connecting the component pulley arrangements (3) to the wind turbine component (2), the wind turbine component (2) being arranged in a first orientation, and at least two component pulley arrangements (3) being attached to the wind turbine component (2) at attaching points (6) which are displaced relative to each other along a vertical direction,
  connecting the hoisting pulley arrangement(s) (4) to a hoisting apparatus,
  mounting the rope (8) in the component pulley arrangements (3) and the hoisting pulley arrangements (4), in such a manner that each component pulley arrangement (3) is connected to two hoisting pulley arrangements (4), or to one hoisting pulley arrangement (4) and a rope end attachment point (9), via the rope (8), and each hoisting pulley arrangement (4) is connected to two component pulley arrangements (3), via the rope (8), and
  lifting the hoisting pulley arrangements (4) by means of the hoisting apparatus, thereby causing a relative movement between the rope (8) and the pulley arrangements (3, 4), said relative movement causing the wind turbine component (2) to rotate into a second orientation, while the wind turbine component (2) is lifted by means of the hoisting apparatus and via the lifting arrangement (1).

Embodiment 9

A method according to embodiment 8, wherein the step of connecting the component pulley arrangements (3) to the wind turbine component (2) comprises connecting the component pulley arrangements (3) at attaching points (6) arranged substantially equidistantly along a circumference of the wind turbine component (2).

Embodiment 10

A method according to embodiment 8 or 9, wherein the step of connecting the hoisting pulley arrangements (4) to a hoisting apparatus comprises connecting all of the hoisting pulley arrangements (4) to a single connecting point.

Embodiment 11

A method according to any of embodiments 8-10, wherein the relative movement between the rope (8) and the pulley arrangements (3, 4), caused by lifting the hoisting pulley arrangements (4), causes lengths of rope (8) arranged between interconnected pulley arrangements (3, 4) to be changed, thereby causing the rotation of the wind turbine component (2).

Embodiment 12

A method according to any of embodiments 8-11, wherein the wind turbine component is a tower segment (2), and wherein the step of connecting the component pulley arrangements (3) to the wind turbine component (2) comprises attaching the component pulley arrangements (3) to a connecting flange (5) of the tower segment (2).

The invention claimed is:

1. A lifting arrangement for lifting a wind turbine tower segment, the lifting arrangement comprising:
  at least two component pulley arrangements, connected to a flange of the tower segment,
  at least one hoisting pulley arrangement, arranged to be connected to a hoisting apparatus, and
  a first rope interconnecting the component pulley arrangements and the hoisting pulley arrangements, in such a manner that each component pulley arrangement is connected to two hoisting pulley arrangements, or to one hoisting pulley arrangement and a rope end attachment point, via the first rope, and each hoisting pulley arrangement is connected to two component pulley arrangements, via the first rope, the first rope being arranged movably in each pulley arrangement,
  wherein each hoisting pulley arrangement is movable in a direction to and from adjacent hoisting pulley arrangements.

2. The lifting arrangement according to claim 1, wherein the attachment points are joined.

3. The lifting arrangement according to claim 1, wherein the attachment points are joined at a single lifting point of the hoisting apparatus.

4. The lifting arrangement according to claim 3, wherein the single lifting point is attached to one single lifting hook of the hoisting apparatus.

5. The lifting arrangement according to claim 1, wherein the first rope, from each attachment point to the nearest component pulley, forms an angle of at least 10 degrees from vertical.

6. The lifting arrangement according to claim 1, wherein each hoisting pulley arrangement is movable in the direction to and from adjacent hoisting pulley arrangements to an extent where adjacent hoisting pulley arrangements touch each other.

7. The lifting arrangement according to claim 1, wherein each component pulley arrangement is attached to attaching points on the flange by means of a second rope attached to the flange.

8. The lifting arrangement according to claim 7, where the second ropes form the same distance from each component pulley arrangement to the corresponding attaching points on the flange.

9. The lifting arrangement according to claim 7, where the second ropes attach each component pulley to at least two attaching points.

10. The lifting arrangement according to claim 1, comprising at least three component pulley arrangements attached to the flange such that the distances between attachment point(s) of each component pulley arrangement and attachment point(s) of an adjacent component pulley arrangement are essentially the same.

11. The lifting arrangement according to claim 1, wherein each of the hoisting pulley arrangements are connected to a single connecting point by a third rope, and wherein each third rope extends from the single connecting point towards the corresponding hoisting pulley arrangement such that they form a cone shape symmetrically with respect to a vertical axis through the single connecting point.

12. The lifting arrangement according to claim 1, wherein the tower segment has a diameter D, wherein the rope has a length L, and wherein L is at least 2 times D.

13. A method for lifting a wind turbine tower segment using a lifting arrangement according to claim 1, the method comprising the steps of:

attaching the component pulley arrangements to the connecting flange of the tower segment, the tower segment being arranged in a first orientation, and at least two component pulley arrangements being attached to the tower segment at attaching points which are displaced relative to each other along a vertical direction, connecting the hoisting pulley arrangement(s) to the hoisting apparatus, mounting the first rope in the component pulley arrangements and the hoisting pulley arrangements, in such a manner that each component pulley arrangement is connected to two hoisting pulley arrangements, or to one hoisting pulley arrangement and the rope end attachment point, via the first rope, and each hoisting pulley arrangement is connected to two component pulley arrangements, via the first rope, and lifting the hoisting pulley arrangements by means of the hoisting apparatus, thereby causing a relative movement between the first rope and the pulley arrangements, said relative movement causing the tower segment to rotate into a second orientation, while the tower segment is lifted by means of the hoisting apparatus and via the lifting arrangement.

14. The method according to claim 13, wherein the step of connecting the component pulley arrangements to the tower segment comprises connecting the component pulley arrangements at attaching points arranged substantially equidistantly along a circumference of the flange.

15. The method according to claim 14, wherein the attaching points are arranged offset at most 120 degrees relative to each other along the circumference of the flange.

16. The method according to claim 13, wherein the relative movement between the first rope and the pulley arrangements, caused by lifting the hoisting pulley arrangements, causes the distance between interconnected pulley arrangements to be changed, thereby causing the rotation of the tower segment.

17. The method according to claim 13, comprising the step of connecting opposite ends of the first rope to a mutual rope attachment point.

18. A lifting arrangement for lifting a wind turbine tower segment, the lifting arrangement comprising:

at least two component pulley arrangements, connected to a flange of the tower segment, at least one hoisting pulley arrangement, arranged to be connected to a hoisting apparatus, and a first rope interconnecting the component pulley arrangements and the hoisting pulley arrangements, in such a manner that each component pulley arrangement is connected to two hoisting pulley arrangements, or to one hoisting pulley arrangement and a rope end attachment point, via the first rope, and each hoisting pulley arrangement is connected to two component pulley arrangements, via the first rope, the first rope being arranged movably in each pulley arrangement, wherein the attachment points are joined at a single lifting point of the hoisting apparatus.

* * * * *